(No Model.)  
3 Sheets—Sheet 3.

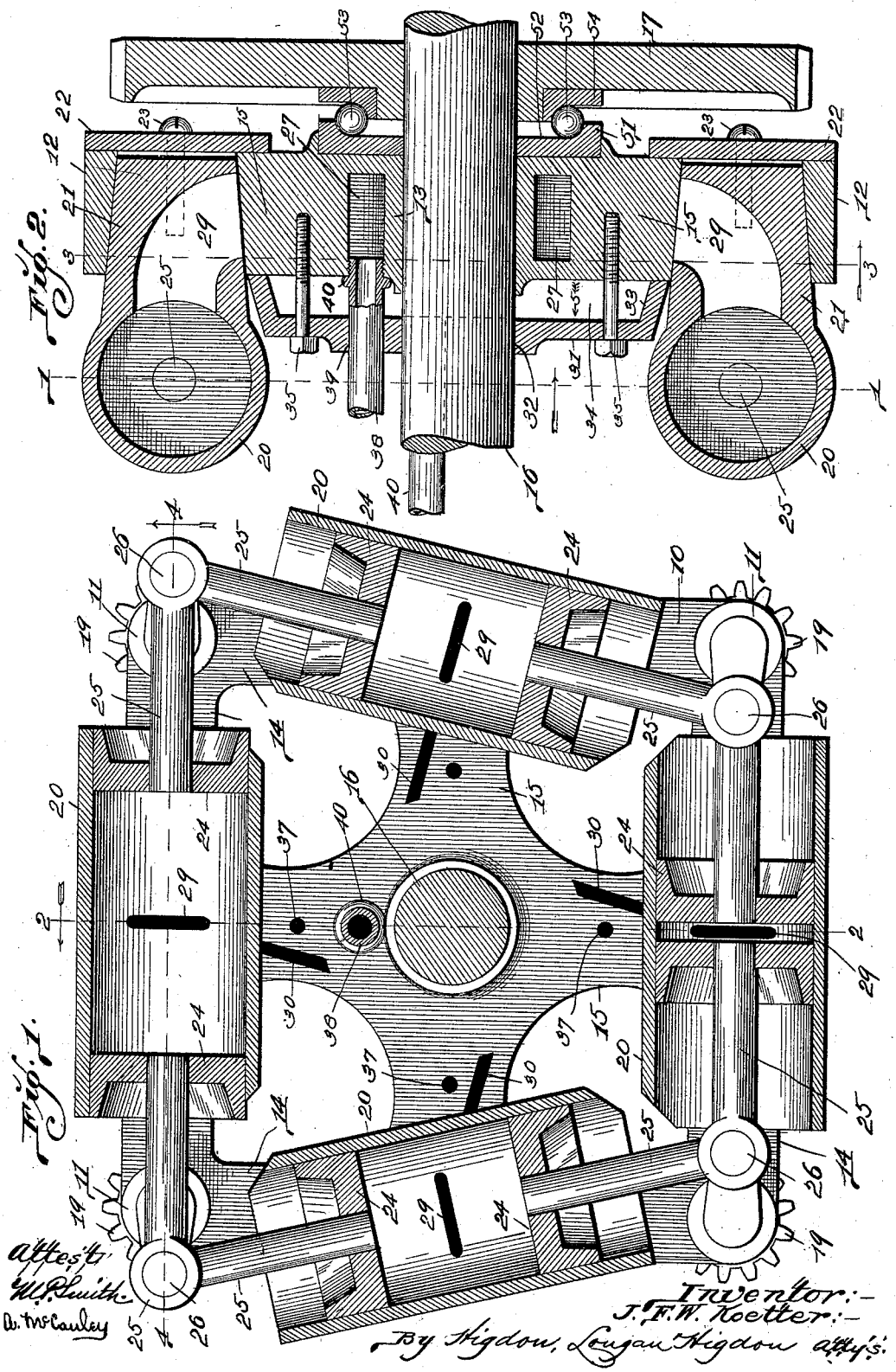

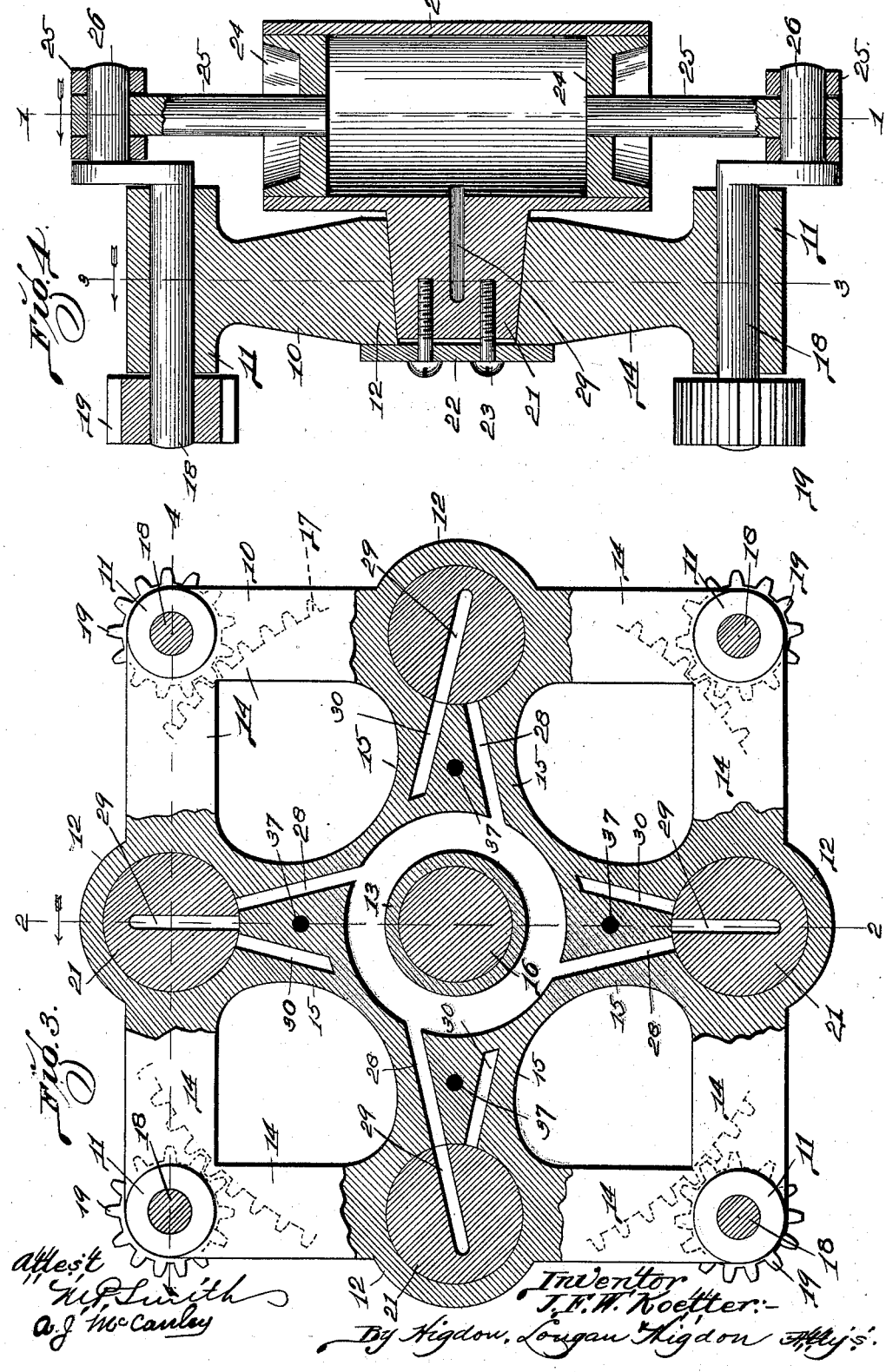

J. F. W. KOETTER.
MOTOR.

No. 605,439.  Patented June 7, 1898.

Attest:  
W. T. Smith  
A. J. McCauley

Inventor:—  
J. F. W. Koetter  
By Higdon, Longan & Higdon  
attys.

UNITED STATES PATENT OFFICE.

JOHN F. W. KOETTER, OF ST. LOUIS, MISSOURI.

MOTOR.

SPECIFICATION forming part of Letters Patent No. 605,439, dated June 7, 1898.

Application filed July 23, 1897. Serial No. 645,735. (No model.)

*To all whom it may concern:*

Be it known that I, JOHN F. W. KOETTER, of the city of St. Louis, State of Missouri, have invented certain new and useful Improvements in Motors, of which the following is a full, clear, and exact description, reference being had to the accompanying drawings, forming a part thereof.

My invention relates to motors; and it consists of the novel construction, combination, and arrangement of parts hereinafter shown, described, and claimed.

Figure 5:
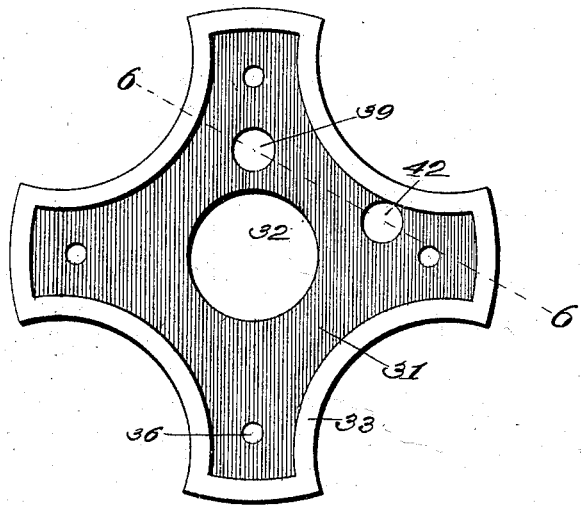
Figure 6:
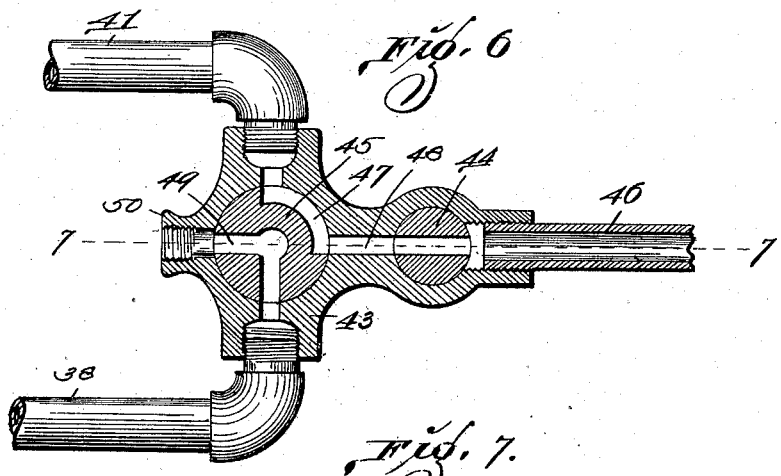
Figure 7:
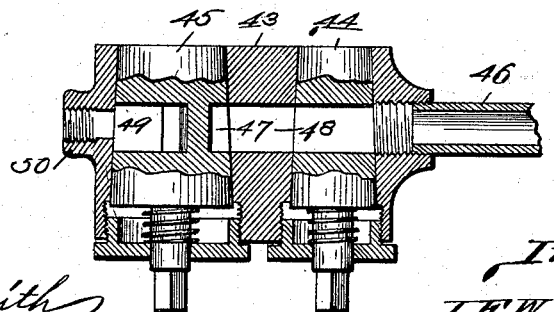

Figure 1 is a vertical section taken transversely of the rotating shaft through the centers of the pistons and approximately on the lines 1 1 of Figs. 2 and 4, parts being removed to more clearly illustrate the construction. Fig. 2 is a section taken approximately on the lines 2 2 of Figs. 1 and 3. Fig. 3 is a view analogous to Fig. 1, taken approximately on the lines 3 3 of Figs. 2 and 3. Fig. 4 is a sectional view taken approximately on the lines 4 4 of Figs. 1 and 3. Fig. 5 is a view in elevation of the rear side of the plate which is removed from Fig. 1 and seen looking in the direction indicated by the arrow 5 in Fig. 2. Fig. 6 is a sectional detail of the regulating-valves and taken on the line 6 6 of Fig. 5 when the plate shown in Fig. 5 is in position for use, said plate not being shown in Fig. 6. Fig. 7 is a sectional detail taken approximately on the line 7 7 of Fig. 6.

My primary object is to construct a motor which may be operated by compressed air, steam, or water for imparting a rotary motion to a shaft, as required, to operate the spindle of a turning-lathe, drill, boring-machine, or similar device. The motor may be employed, however, upon the axles of a wagon, car, or locomotive for other purposes.

Referring by numerals to the drawings, the frame 10 consists of the four bearings 11, arranged in the form of a square, the four bearings 12, arranged in the form of a square, the bearing 13, arranged at the centers of the squares formed by the bearings 11 and 12, the arms 14, connecting the bearings 11 with the bearings 12, and the arms 15, connecting the bearings 12 with the bearing 13. A shaft 16 is mounted in the bearing 13, and the spur-gear 17 is fixed upon said shaft. The four crank-shafts 18 are mounted in the bearings 11, and the pinions 19 are fixed upon the crank-shafts 18 and mesh with the gear 17. The cylinders 20 have the trunnions 21 projecting from their centers at right angles to the passages through said cylinders, and said trunnions 21 are mounted in the bearings 12. The trunnions 21 are slightly tapered and extend nearly through the bearings.

The plates 22 are placed upon the opposite sides of the bearings from the cylinders 20, and the machine-screws 23 are inserted through the plates 22 into the trunnions 21, thus preventing the trunnions from being withdrawn from their bearings. The lost motion caused by wearing of the bearings or trunnions may be taken up by tightening the screws 23.

A piston 24 operates in each end of each of the cylinders 20, and a piston-rod 25 connects each of the pistons 24 with the crank-pins 26, carried by the crank-shafts 18. Alternate ones of the piston-rods 25 are bifurcated at their outer ends, as required to allow two piston-rods to be connected to each crank-pin without throwing the pistons out of alinement. The inner ends of the arms 15 are cored to form the steam-chamber 27, and said arms are also cored to form the ports 28, leading from the steam-chamber 27 to the bearings 12. The ports 29 are formed in the trunnions 21 to communicate with the ports 28, said ports 29 leading into the cylinders 20. Ports 30 lead from the bearings 12 out of the arms 15.

The plate 31 has an opening 32 in its center to receive the shaft 16, and said plate is placed in position upon the shaft 16 with its flange 33 engaging against the faces of the arms 15, as required to form a steam-chamber 34, into which the ports 30 lead. The lag-screws 35 are inserted through the openings 36 in the plate 31 and into the screw-threaded apertures 37 in the arms 15, as required to hold the plate securely in position. A pipe 38 leads through the opening 39 in the plate 31 and is screw-seated in the bearing 40 and communicates with the steam-chamber 27. A pipe 41 has one of its ends screw-seated in the opening 42 in the plate 31 and communicates with the steam-chamber 34. The outer ends of the pipes 38 and 41 are connected by the block 43, in which the controlling-valves 44 and 45 operate.

The supply-pipe 46 leads to one end of the block 43, said block being T-shaped in section, as shown in Fig. 6. The valve 44 regulates the amount of steam, air, or water which passes through the pipe 46 to the valve 45, and the valve 45 regulates the direction of the motor.

When the valves are in the positions shown in Fig. 6, the passage 47 is formed in the valve 45 and leads from the passage 48 to the pipe 41, and the fluid will enter the steam-chamber 34 and from said steam-chamber will pass through the ports 30 into the cylinders 20 and operate the pistons 24 outwardly from the centers of the cylinders to their limit of movement, thus rotating the crank-shafts 18. From the cylinders 20 the steam will exhaust through the ports 28 to the steam-chamber 27 and to the pipe 38, to the passage 49 in the valve 45, and then through the nipple 50 to the open air or to the pipe connected to said nipple. When the valve 45 is rotated by a quarter-turn, the passage 47 will lead from the passage 48 to the pipe 38 and the passage 49 will lead through the pipe 41 to the open air, thus reversing the motor.

The bearing-plate 51 is attached to the bearing 13 and has a circular recess 52 in its outer face, in which the bearing-balls 53 operate. The bearing-plate 54 is attached to the inner face of the hub of the gear 17 and engages the bearing-balls 53, as required to form an antifriction connection between the gear 17 and the frame of the motor.

The cylinders 20 are arranged in the form of a square, as shown in Fig. 1, and are connected to the crank-shafts 18 and through the crank-shafts to the pinions 19 and the gear 17 in such relative positions that when steam-pressure is just beginning to enter one of the cylinders the opposite one of the cylinders has done its work and is beginning to exhaust, and the third cylinder is half filled with steam, and the fourth cylinder is half exhausted. The cylinders rock upon the trunnions 21 by the motion of the crank-shafts, thus regulating the passages through the ports 28, 29, and 30 by turning the trunnions 21 in the bearings 12, as indicated in Fig. 3. The operation of the piston rotates the crank-shafts 18, thus rotating the pinions 19 and the gear 17, and the gear 17 rotates the shaft 16.

The shaft 16 may be the spindle of a turning-lathe, a drill, boring-machine, or other similar instrument, or it may be the axle of a wagon, car, or locomotive, or it may be any other device which it is desired to rotate.

If it is desired to only run the motor in one direction, the plate 31 may be omitted and the steam exhaust to the open air through the ports 30. When the plate 31 is omitted, the switch-valve 45 may also be omitted.

The power derived from a given amount of steam, air, or water at a given pressure is greatly increased by using two pistons in a cylinder and injecting the steam between said pistons, because the power which would otherwise be exerted against the dead end of the cylinder is utilized.

I claim—

1. In a motor, a suitable frame, a steam-chamber formed in the center of said frame, bearings formed in the sides of said frame, suitable cylinders, trunnions formed integral with the centers of said cylinders, which trunnions operate in the previously-mentioned bearings, in which trunnions are formed ports that are arranged to communicate with ports formed in the frame, certain of which ports communicate with the steam-chamber in the frame, shafts journaled in the corners of the frame, on which shafts are formed cranks, pistons operating in each end of each of the cylinders, piston-rods connecting said pistons with the cranks, pinions mounted upon the shafts on the opposite end from the cranks, a rotatable shaft passing through the motor-frame, and a gear-wheel mounted upon said shaft, which gear-wheel meshes with the pinions, substantially as specified.

2. In a motor, a suitable frame, in the center of which is formed a suitable steam-chamber and in which frame are formed suitable steam-ports, certain of which ports communicate with said chamber, a plate located upon the front of the frame to form a chamber with which the remaining ports communicate, bearings formed in the sides of the motor-frame, suitable steam-cylinders, trunnions formed integral with the centers of said cylinders, which trunnions operate in the bearings of the frame, in which trunnions are formed ports that communicate with the hereinbefore-mentioned ports, pistons operating in each end of each cylinder, crank-shafts rotatably mounted in the corners of the motor-frame, piston-rods connecting the pistons with said crank-shafts, pinions located upon said crank-shafts, a rotatable shaft passing through the center of the motor-frame, a gear-wheel fixed upon said shaft, a bearing-plate carried by the motor-frame, a bearing-plate carried by the gear-wheel, and ball-bearings interposed between said bearing-plates, substantially as specified.

3. In a motor, a plurality of cylinders arranged radially relative to a given point, pistons operating in each end of each of said cylinders, piston-rods for said pistons, the end of each piston-rod being connected to the next adjacent piston-rod, and means whereby fluid is introduced between said pistons, substantially as specified.

4. In a motor, a plurality of cylinders arranged radially relative to a given point, pistons operating in each end of each of said cylinders, piston-rods for said pistons, each piston-rod being connected to the next adjacent piston-rod, which cylinders, pistons and piston-rods form connections whereby their force is united, and means of injecting fluid between said pistons, substantially as specified.

5. In a motor, a shaft rotatably mounted, a frame carried by said shaft, a plurality of cylinders carried by said frame and arranged radially relative to the shaft, pistons operating in each end of each of said cylinders, piston-rods for said pistons, each one of said piston-rods being connected to the next adjacent piston-rod to unite the force of the pistons, means whereby fluid is injected into the cylinders between the pistons, and means for transmitting the united force of the pistons to the rotatably-mounted shaft, substantially as specified.

In testimony whereof I affix my signature in presence of two witnesses.

JOHN F. W. KOETTER.

Witnesses:
A. J. McCAULEY,
EDWARD E. LONGAN.